United States Patent [19]

Brisson

[11] Patent Number: 5,044,652

[45] Date of Patent: Sep. 3, 1991

[54] MULTI-BALLED ROTATABLE TRAILER HITCH

[76] Inventor: Roger Brisson, P.O. Box 523, Elliot Lake, Ontario, Canada, P5A 2J9

[21] Appl. No.: 531,083

[22] Filed: May 31, 1990

[51] Int. Cl.[5] .............................................. B60D 1/06
[52] U.S. Cl. .................................. 280/416.1; 280/511
[58] Field of Search ................. 280/415.1, 416.1, 511, 280/504

[56] References Cited

U.S. PATENT DOCUMENTS 2,911,233  11/1959  Riddle ............................. 280/416.1
4,456,279  6/1984  Dirck ............................... 280/416.1

Primary Examiner—Mitchell J. Hill

[57] ABSTRACT

The present invention provides a multiple ball trailer hitch comprising a bumper mount and a hitch plate provided with a plurality of different sized hitch balls. The hitch plate is settable on the bumper mount in a plurality of different hitch ball presenting positions according to desired hitch ball size. The overall trailer hitch has a pulling axis and the hitch plate is secured to the bumper mount by at least two securing posts in line with the pulling axis with the hitch ball in use being supported from beneath by the bumper mount.

4 Claims, 2 Drawing Sheets

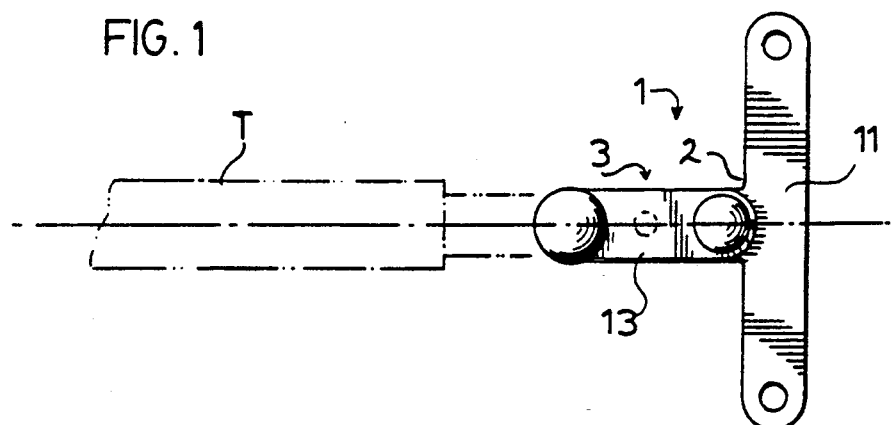
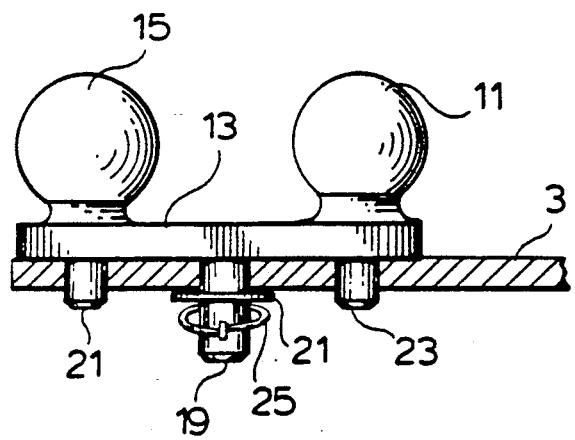
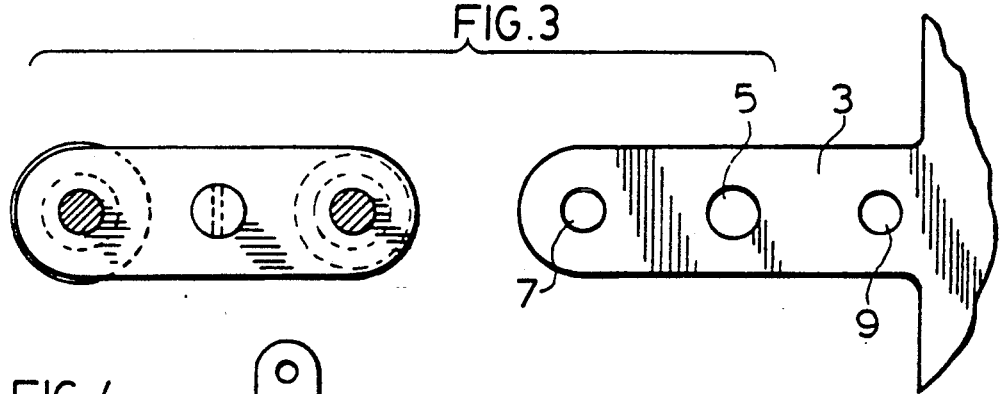
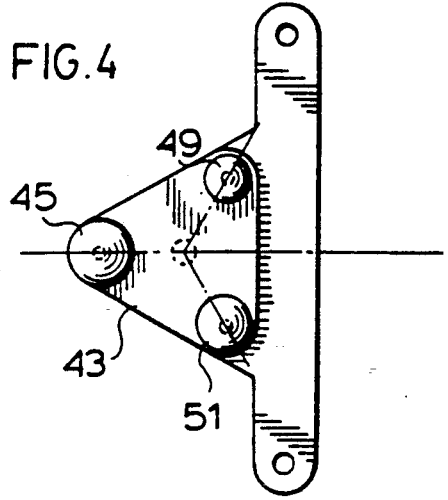
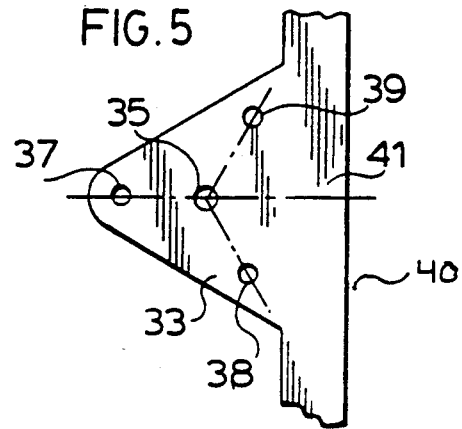

MULTI-BALLED ROTATABLE TRAILER HITCH

FIELD OF THE INVENTION

The present invention relates to a trailer hitch including a plurality of different sized hitch balls enabling selection of a particular desired size of hitch ball.

BACKGROUND OF THE INVENTION

Most trailer hitches have a single hitch ball designed to fit with a particular sized trailer coupler. If it is desired to tow trailers having different sized couplers then the conventional one ball hitch cannot be used with these other sized couplers. In order to get around this problem, bumper plates have been provided with three holes, however only one of these holes is at the center of the vehicle while the other two holes are off center and provide an off center pull of the trailer. This increases the danger of sway action on the trailer particularly on slippery roads, resulting in jacknifing of the trailer and rendering the braking sytem ineffective.

I have developed, what I refer to as a spinning trailer hitch as covered in my Canadian Patent 1,216,316. The concept of my earlier patented trailer hitch, i.e. a hitch spinable to preset the required ball size on the line of pull of the hitch has substatial benefits over the conventional arrangements described immediately above. An arrangement similar to my own patented structure is also covered in U.S. Pat. No. 4,456,279 dated June 26, 1984 to Dirck.

Both the Dirck structure as well as my own earlier patented structure do however suffer from a common drawback. More particularly, there is no support from the bumper mount to the hitch plate directly at the hitch ball used for the towing. According to my own earlier patent as well as the Dirck patent, the hitch ball in use sits out over the bumper mount unsupported from beneath. The Dirck structure suffers from the further drawback that it relies on a single rotation preventing pin which is off line of the pulling axis of the hitch. Therefore, there are extremely high sheering pressures placed on this pin which, if not actually broken, is likely to jamb in position making it almost impossible to remove by hand from the Dirck trailer hitch.

SUMMARY OF THE PRESENT INVENTION

The present invention provides a trailer hitch overcoming the drawbacks noted immediately above. More specifically the trailer hitch of the present invention comprises a bumper mount and a hitch plate with at least two different sized hitch balls. The hitch plate is settable on the bumper mount in different hitch ball presenting positions according to the size of hitch ball desired. The trailer hitch is provided with a center securing post between the hitch plate and the bumper mount on the pulling axis of the trailer hitch as well as at least one other securing post on the pulling axis and immediately beneath the in use hitch ball for securing the hitch plate against rotation on the bumper mount.

In a two ball arrangement, the trailer hitch includes three in line securing posts and in a three ball arrangement, the hitch includes two in line securing posts with a further pair of securing posts balanced to either side of the in line securing posts. Therefore, according to all embodiments, the trailer hitch is effectively reinforced against rotation of the hitch plate on the bumper mount.

BRIEF DESCRIPTION OF THE DRAWINGS

The above as well as other advantages and features of the present invention will be described in greater detail according to the preferred embodiments of the present invention in which;

FIG. 1 is a top plan view of a trailer hitch including bumper mount and a two ball hitch plate according to a preferred embodiment of the present invention.

FIG. 2 is a sectional view through the secured location of the hitch plate to the bumper mount of FIG. 1.

FIG. 3 is a bottom view through the hitch plate of FIG. 2.

FIG. 4 is a plan view of a three ball trailer hitch according to a further preferred embodiment of the present invention.

FIG. 5 is a top plan view of the bumper mount from the trailer hitch of FIG. 4.

Figure 6:
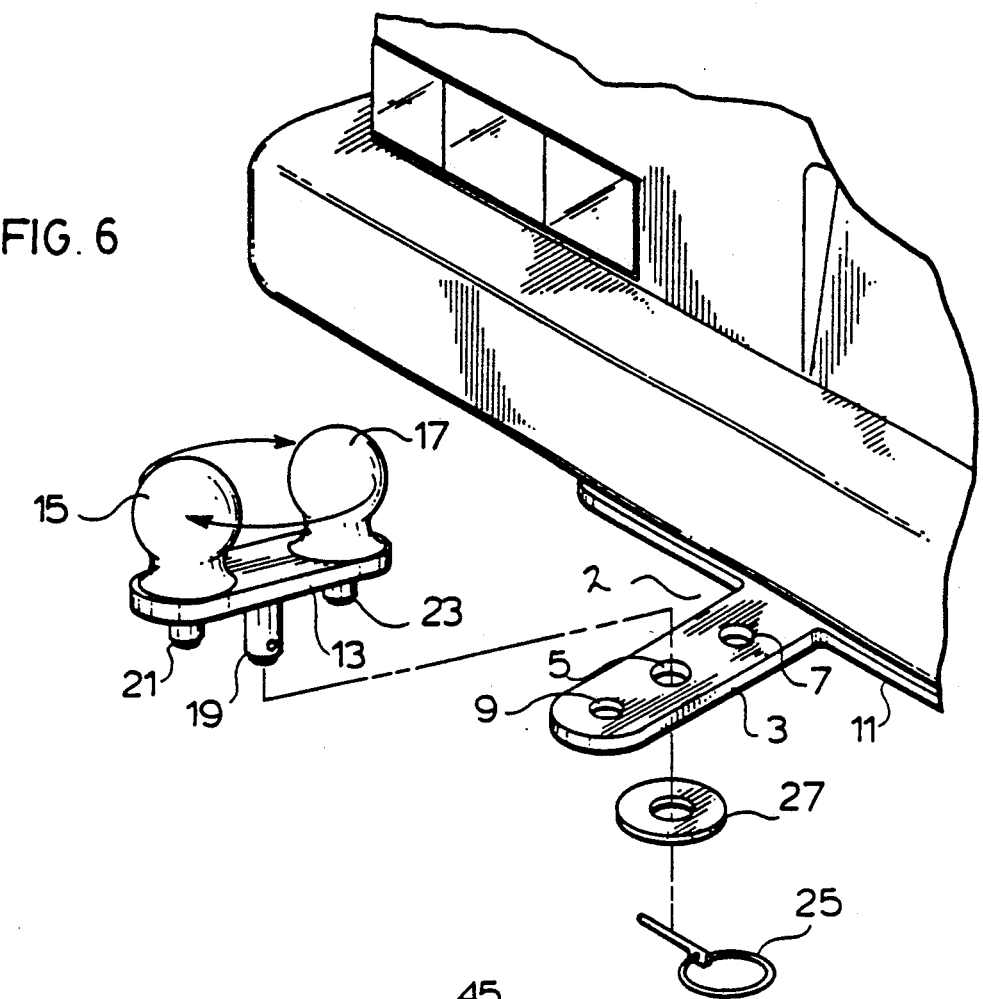
FIG. 6 is a perspective view showing the operation of the trailer hitch of FIG. 1 with the bumper mount secured to an automobile.

DETAILED DESCRIPTION ACCORDING TO A PREFERRED EMBODIMENT OF THE PRESENT INVENTION IN WHICH:

FIG. 1 shows a trailer hitch generally indicated at 1 for coupling with a tow-bar T of a trailer. Trailer hitch 1 includes in combination a bumper mount 2 having a securing portion 11 for fitting to the bumper and a forwardly extending hitch plate mounting portion 3 seen in FIG. 2 of the drawings. Hitch plate 13 which fits to the bumper mount includes a pair of different sized hitch balls 15 and 17. The hitch plate is settable on the bumper mount in either the FIG. 2 position or reversed from that position according to the hitch ball size desired to fit with the trailer tow bar.

The hitch plate includes a center securing post 19 as well as a pair of secondary posts 21 and 23 to either side of the center post and immediately beneath each of the hitch balls 15 and 17 respectively. Center post 19 is locked on to the bumper mount by means of a spring loaded lock pin 25 better seen in FIG. 6 of the drawings. This lock pin slides in and out of a small opening projecting laterally through post 19 with the spring loaded clip portion on the lock pin holding it in its secured position as shown in FIG. 2 of the drawings.

For purposes of tightening the fit between hitch plate 13 and the bumper mount a washer 27 is provided filling in the gaps between the locking pin and the bottom surface of the bumper mount.

As will be clearly seen from FIG. 3 of the drawings, all three of the securing posts 19, 21 and 23 which fit into openings 5, 7 and 9 respectively of the bumper mount are located along the line of pull of the trailer hitch. Moreover, the bumper mount extends the full length of the hitch plate, so that the hitch plate is completely supported from beneath by the bumper mount. In addition, securing post 21 immediately beneath the in-use hitch ball 15 substantially eliminates any twisting or torquing moments on the hitch plate at its rearward most location where the effect of swerving or swaying of the trailer is the greatest on the hitch plate. This is to be compared to earlier designs where the rearwardly positioned in-use hitch ball is unsupported from below.

Figure 7:
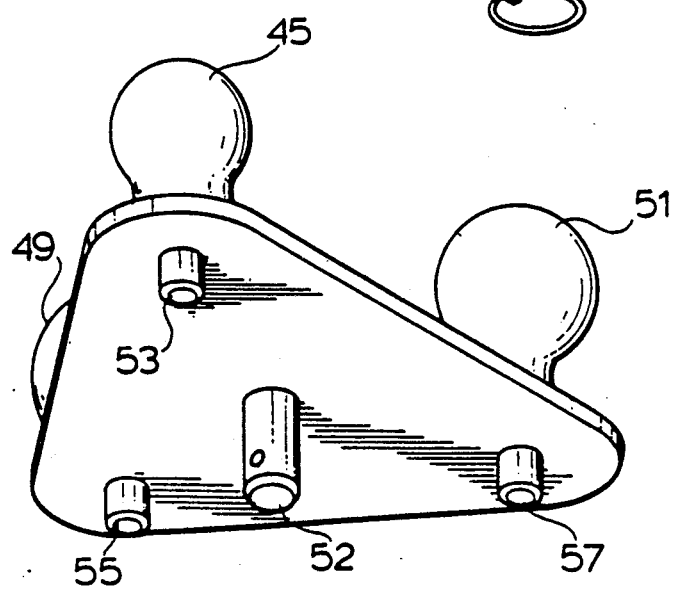
FIG. 7 is a bottom perspective view of the triple ball hitch plate from the trailer hitch of FIG. 4.

FIGS. 4, 5 and 7 show a further preferred embodiment of the present invention including a bumper mount 40 having a bumper securing portion 41 and a rearwardly extending hitch plate receiving portion 33. This hitch plate receiving portion, like the hitch plate 43 itself, has a triangular configuration. The hitch plate is provided with three hitch balls 45, 49, and 51. Extending from the bottom of the hitch plate is a central mounting or securing post 52 as well as additional securing posts 53, 55 and 57 beneath the hitch balls 45, 49 and 51. The hitch plate receiving portion 33 of the bumper mount includes a center hole 35 as well as outer perimeter holes 37, 38 and 39. Note that holes 37 and 35 are once again in line with the pulling axis of the trailer hitch, while holes 38 and 39 are balanced to either side of that pulling axis. Accordingly, once the hitch plate is set on the bumper mount in the desired position, it is effectively secured against rotation on the bumper mount. Further and once again consistent with the two ball hitch described above, the rearward in-use ball 45 is supported from beneath by the bumper mount as well as locking post 53 secured in hole 37 of the bumper mount.

Although not shown, a similar locking pin and washer arrangement shown in FIG. 6 is used for locking the hitch plate to the bumper mount of FIG. 4.

A further feature resulting from the construction of a hitch plate with downwardly extending posts for securing it against rotation on the bumper mount is that the hitch balls themselves provide handles for lifting the hitch plate once the locking pin has been removed from the bumper mount. Therefore, even in the event that the posts on the bottom of the hitch plate become jambed in their respective holes on the bumper mount, one is still likely able to release the hitch plate from the bumper mount through the significant leverage factor provided by the hitch balls themselves. This is to be compared to the Dirck arrangement where the small locking pin is totally separate from the hitch plate and if jambed, which is likely to occur because of road dirt and the like, would be extremely difficult to release without requiring special tools.

Although various preferred embodiments of the invention have been described in detail, it is to be appreciated that variations may be made without departing from the spirit of the invention or the scope of the appended claims.

The embodiments of the invention in which an exclusive property or privilege is claimed are defined as follows:

1. A trailer hitch comprising in combination a bumper mount and hitch plate supporting a plurality of different sized hitch balls, said hitch plate being settable on said bumper mount in a plurality of different positions to locate a particular one of said hitch balls in a towing position, said trailer hitch having a pulling axis and said hitch plate being secured to said bumper mount by at least two securing posts in line with said pulling axis, one of said posts being located immediately beneath the hitch ball set in the towing position.

2. A trailer hitch as claimed in claim 1, wherein said securing posts are an integral part of said hitch plate with said hitch balls providing a hand grip for removing said hitch plate from said bumper mount.

3. A trailer hitch as claimed in claim 1, including first and second hitch balls and three securing posts all in line with said pulling axis, said three securing posts comprising first and second posts immediately beneath said first and second hitch balls and fitted into said bumper mount, and a center post in line between said first and second posts.

4. A trailer hitch as claimed in claim 1, including three hitch balls and four securing posts, two of which are in line with said pulling axis, the other two of which are equally spaced in a balanced position to either side of said pulling axis.

* * * * *